United States Patent [19]

Takeda et al.

[11] Patent Number: 5,418,208
[45] Date of Patent: May 23, 1995

[54] LAMINATED PLASTIC CARD

[75] Inventors: Hideyuki Takeda; Noriyuki Kawashima, both of Tokyo, Japan

[73] Assignee: Fujipla, Inc., Tokyo, Japan

[21] Appl. No.: 57,461

[22] Filed: May 6, 1993

[30] Foreign Application Priority Data

Sep. 25, 1992 [JP] Japan .................. 4-066583 U

[51] Int. Cl.⁶ ............................................. B41M 5/035
[52] U.S. Cl. ...................... 503/227; 428/195;
428/204; 428/412; 428/480; 428/483; 428/500;
428/913; 428/914
[58] Field of Search .............. 428/195, 201, 203, 204,
428/412, 480, 483, 500, 510, 511, 914, 913;
503/227

[56] References Cited

U.S. PATENT DOCUMENTS

| | | | |
|---|---|---|---|
| 3,772,064 | 11/1973 | Mendelsohn et al. | 428/355 |
| 4,505,975 | 3/1985 | Majima | 428/336 |
| 4,645,805 | 2/1987 | Gaku et al. | 525/437 |
| 4,713,365 | 12/1987 | Harrison | 503/227 |
| 4,977,136 | 12/1990 | Fujiwara et al. | 503/227 |
| 5,171,625 | 12/1992 | Newton | 428/195 |

Primary Examiner—Patrick J. Ryan
Assistant Examiner—Marie R. Macholl
Attorney, Agent, or Firm—Dickinson, Wright, Moon, Van Dusen & Freeman

[57] ABSTRACT

A laminated plastic card provided a lamination of a dye accepting layer, a substrate of paper or the like, and a back coat layer, on which lamination one or more patterns are printed with a volatile dye, and a transparent plastic film adhered on the lamination by an adhesive agent, wherein the adhesive agent is a saturated polyester resin having an average molecular weight of approximately 18,000 gm/mole and produced by condensation polymerization of polypropylene glycol or trimethylol propane and adipic acid or azelaic acid.

7 Claims, 1 Drawing Sheet

LAMINATED PLASTIC CARD

FIELD OF THE INVENTION

This invention relates to an improved laminated plastic card. More specifically, this invention relates to a laminated plastic card containing a layer having descriptive or graphic information printed with a volatile dye. The volatile dye comprises a mixture of one or more dyes and a powder which easily sublimes. The descriptive or graphic information is printed with, preferably, a videoprinter, and the printed layer of descriptive or graphic information is covered by a transparent plastic film.

BACKGROUND OF THE INVENTION

Laminated plastic cards are widely employed as certificates of citizenship, identification cards, passports, driver's licenses, and the like. They generally consist of a paper or plastic film with descriptive information, such as the name, residence, title, or the like, of the holder of the card printed thereon and a photograph of the holder pasted thereon. The upper or lower surface of the card, or both, is covered by a plastic film.

Since these certificates are often the target of forgery, various efforts have been used to make such forgery more difficult.

One method of preventing forgery of a laminated plastic card is the replacement of the photograph with an image created by electronic graphic technology. In accordance with this technique, descriptive and graphic information are stored in an electronic memory device and printed on a sheet of paper by a videoprinter that is based on the thermal transfer printing system. The ink used in this printing system contains one or more volatile dyes that are sublimed by heating and transferred to a substrate, e.g., paper, a polyester resin film, or an ethylene-vinyl acetate resin film. The upper or lower surface, or both, of the substrate is covered by one or more transparent plastic films of polyethylene terephthalate or polycarbonate. Ethylene ethyl acrylate or ethylene-vinyl acetate is employed to adhere the film of polyethylene terephthalate or polycarbonate to the surface of the videoprint.

An example of a laminated plastic card that is available in the prior art is shown in FIG. 1. A lamination 10 comprises a dye accepting layer 5 of a polyester resin or an ethylene-vinyl acetate resin, a substrate 6 of paper or synthetic paper, and a back coat layer 7 of an acrylate resin. The dye accepting layer accepts and firmly fixes one or more dyes sublimed from a volatile dye mixture, and the back coat layer 7 allows control of the feeding of the lamination 10 in a videoprinter. The videoprinter is employed to print patterns 8 containing descriptive and graphic information by a thermal transfer printing system with which one or more dyes sublimed from a volatile dye is transferred to the dye accepting layer 5. A transparent plastic film 1 of polyethylene terephthalate or polycarbonate is adhered on the lamination 10 by an adhesive agent of ethylene ethyl acrylate or ethylene-vinyl acetate. A hardened adhesive layer is illustrated as 2.

A laminated plastic card produced in this manner is effective in preventing forgery because all of the visible information is printed in one plane on the same sheet.

These known cards, however, suffer from the disadvantage that the dye migrates from the dye accepting layer into the adhesive layer. As a result, the picture and description diffuse to become illegible. In addition, ethylene ethyl acrylate and ethylene-vinyl acetate do not strongly adhere to a dye accepting layer of polyester resins or ethylene-vinyl acetate resins. This allows a plastic film of polyethylene terephtalate or polycarbonate to be readily peeled from the dye accepting layer of polyester resins or ethylene-vinyl acetate resins and employed to cover another videoprint prepared for the purpose of forgery.

SUMMARY OF THE INVENTION

An object of this invention is to provide a laminated plastic card comprising (1) a lamination of a dye accepting layer, a substrate of paper or synthetic paper, and a back coat layer on which lamination at least one pattern is printed with a volatile dye that is a mixture of one or more dyes and a powder that is easily sublimed, and (2) a transparent plastic film adhered on the lamination such that it is not easily peeled therefrom, wherein the pattern printed with the volatile dye neither diffuses nor bleeds, and remains legible.

To achieve the foregoing object, a laminated plastic card in accordance with this invention uses saturated polyester resins for the adhesive agent that adheres the transparent plastic film to the lamination of a dye accepting layer, a substrate of paper or synthetic paper, and a back coat layer.

An example of a preferred saturated polyester resin is a saturated polyester resin having an average molecular weight of approximately 18,000 gm/mole and which is produced by condensation polymerization conducted by employing polypropylene glycol or trimethylol propane as the polyhydric alcohol and adipic acid or azelaic acid as the polybasic (polycarboxylic) acid.

DETAILED DESCRIPTION OF THE INVENTION

Figure 1:
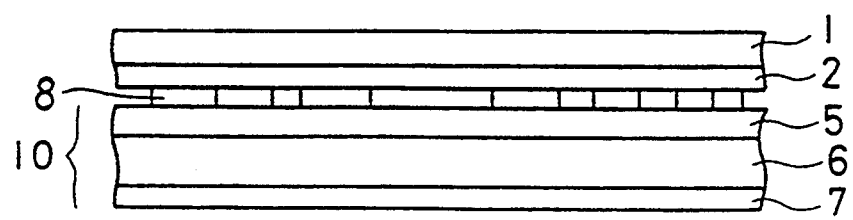
FIG. 1 is a schematic side view of a prior art laminated plastic card showing the layer construction.
Figure 2:
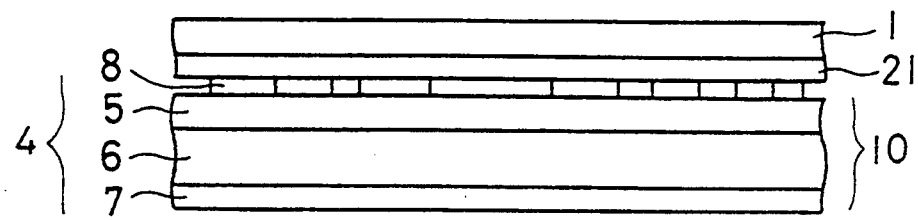
FIG. 2 is a schematic side view of a laminated plastic card in accordance with this invention.

Referring to FIG. 2, a dye accepting layer 5 of a polyester resin or an ethylene-vinyl acetate resin, a substrate 6 of paper or a synthetic paper of polypropylene, and a back coat layer 7 of an acrylate resin are adhered together to form a lamination 10.

A videoprinter (not shown) is preferably employed to print patterns 8 with a volatile dye that is a mixture of one or more dyes and a powder, the mixture being easy to sublime. The videoprinter uses a thermal transfer printing system with which one or more of the dyes contained in the volatile dye is sublimed by heating and transferred to the foregoing dye accepting layer 5. The patterns 8 represent descriptive information, e.g. the full name, title, etc. of the holder of the laminated plastic card and graphic information, e.g. a photograph, bar code, etc. of the holder of the laminated plastic card. In this manner, a mount 4 is produced.

A transparent plastic film 1 is adhered to the mount 4, or the lamination 10 on which patterns 8 were printed with the volatile dye, to produce a laminated plastic card. The adhesive agent employed for this purpose is a saturated polyester resin, e.g. a saturated polyester resin having an average molecular weight of approximately 18,000 gm/mole and which is produced by condensation polymerization employing polypropylene glycol or trimethylol propane as the polyhydric alcohol and adipic acid or azelaic acid as the polybasic acid. The hardened layer of this adhesive agent is shown as 21 in FIG. 2.

Because saturated polyester resins are stable when in contact with the volatile dyes of the present invention, no migration occurs. As a result, the patterns made of the dye neither bleeds nor diffuses, and the descriptive and graphic information remains legible for a long time. Moreover, because the saturated polyester resins adhere strongly to the polyester resins or ethylene-vinyl acetate resins, it is difficult to peel the transparent plastic film away from the dye accepting layer. Thus, the laminated plastic card of this invention resists forgery.

It will be appreciated that an improved laminated plastic card that is durable, remains legible for a long time, and resists forgery has been described. Modifications within the scope of the appended claims will be apparent to those of skill in the art.

What is claimed is:

1. A lamination comprising a dye accepting layer having information imprinted thereon with a dye and a transparent plastic film adhered to said dye accepting layer, the improvement wherein said transparent film is adhered to said dye accepting layer by an adhesive composition consisting essentially of an aliphatic saturated polyester resin produced by condensation polymerization of an alcohol selected from the group consisting of polypropylene glycol and trimethylol propane, and a carboxylic acid selected from the group consisting of adipic acid and azelaic acids.

2. A lamination according to claim 1 wherein said dye accepting layer is selected from the group consisting of polyester resins and ethylene-vinyl acetate resins.

3. A lamination according to claim 2 wherein said transparent plastic film is selected from the group consisting of polyethylene terephthalate and polycarbonate.

4. A lamination according to claim 3 wherein said saturated polyester resin has an average molecular weight of about 18,000 gm/mole.

5. A laminated plastic card, comprising:
   a substrate;
   a dye accepting layer disposed on a first side of said substrate;
   a back coat layer disposed on a second side of said substrate;
   an adhesive layer disposed on said dye accepting layer; and
   a transparent plastic film disposed on said adhesive layer; wherein at least one pattern is printed on said dye accepting layer with a volatile dye, and wherein said adhesive layer consists essentially of an aliphatic saturated polyester resin produced by condensation polymerization of an alcohol selected from the group consisting of polypropylene glycol and trimethylol propane, and a carboxylic acid selected from the group consisting of adipic acid and azelaic acid.

6. A laminated plastic card according to claim 5, wherein said aliphatic saturated polyester resin has an average molecular weight of approximately 18,000 gm/mole.

7. A laminated plastic card according to claim 5, wherein said dye accepting layer comprises a material selected from the group consisting of polyester resins and ethylene-vinyl acetate resins, said back coat layer comprises an acrylate resin, and said transparent plastic film comprises a material selected from the group consisting of polyethylene terephthalate and polycarbonate.

* * * * *